FLUID OPERATED LOGICAL DEVICES

Filed May 12, 1961 6 Sheets-Sheet 1

INVENTOR
HANS H. GLATTLI
BY Robert E. Sandt
AGENT

FLUID OPERATED LOGICAL DEVICES
Filed May 12, 1961
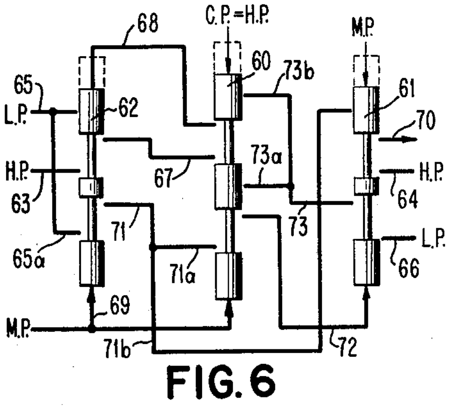
FIG. 6
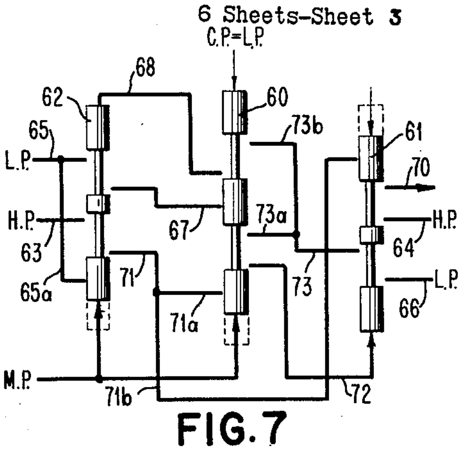
FIG. 7
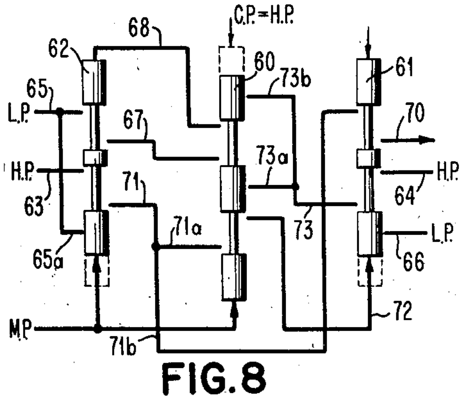
FIG. 8
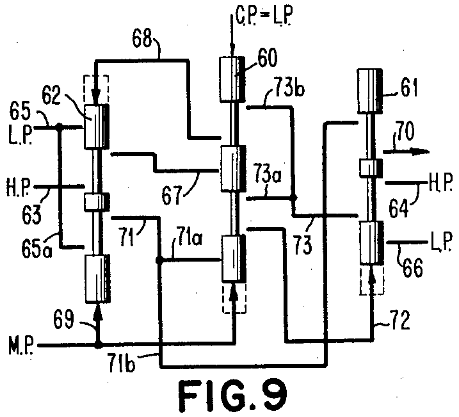
FIG. 9
| FIG | INPUT C.P. | VALVE 60 | VALVE 62 | VALVE 61 | OUTPUT |
|---|---|---|---|---|---|
| 6 | H.P. (0) | DOWN (0) | DOWN (0) | DOWN (0) | H.P. (0) |
| 7 | L.P. (1) | UP (1) | UP (1) | DOWN (0) | H.P. (0) |
| 8 | H.P. (0) | DOWN (0) | UP (1) | UP (1) | H.P. (0) |
| 9 | L.P. (1) | UP (1) | DOWN (0) | UP (1) | L.P. (1) |
| 6 | H.P. (0) | DOWN (0) | DOWN (0) | DOWN (0) | H.P. (0) |
FIG. 10
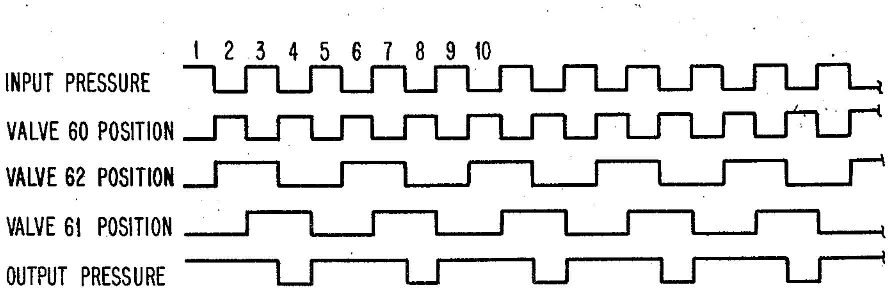
FIG. 11

Mod 5
MULTIPLICAND

| | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

PRODUCT
MULTIPLIER

Mod. 5

| | 1 | 2 | 3 | 4 |
|---|---|---|---|---|
| 1 | 1 | 2 | 3 | 4 |
| 2 | 2 | 4 | 1 | 3 |
| 3 | 3 | 1 | 4 | 2 |
| 4 | 4 | 3 | 2 | 1 |

Mod 5

| | 1 | 2 | 4 | 3 |
|---|---|---|---|---|
| 1 | 1 | 2 | 4 | 3 |
| 2 | 2 | 4 | 3 | 1 |
| 4 | 4 | 3 | 1 | 2 |
| 3 | 3 | 1 | 2 | 4 |

| | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 1 | 2 | 3 | 4 | 5 | 6 |
| 2 | 0 | 2 | 4 | 6 | 1 | 3 | 5 |
| 3 | 0 | 3 | 6 | 2 | 5 | 1 | 4 |
| 4 | 0 | 4 | 1 | 5 | 2 | 6 | 3 |
| 5 | 0 | 5 | 3 | 1 | 6 | 4 | 2 |
| 6 | 0 | 6 | 5 | 4 | 3 | 2 | 1 |

| | 1 | 2 | 3 | 4 | 5 | 6 |
|---|---|---|---|---|---|---|
| 1 | 1 | 2 | 3 | 4 | 5 | 6 |
| 2 | 2 | 4 | 6 | 1 | 3 | 5 |
| 3 | 3 | 6 | 2 | 5 | 1 | 4 |
| 4 | 4 | 1 | 5 | 2 | 6 | 3 |
| 5 | 5 | 3 | 1 | 6 | 4 | 2 |
| 6 | 6 | 5 | 4 | 3 | 2 | 1 |

| | 1 | 3 | 2 | 6 | 4 | 5 |
|---|---|---|---|---|---|---|
| 1 | 1 | 3 | 2 | 6 | 4 | 5 |
| 3 | 3 | 2 | 6 | 4 | 5 | 1 |
| 2 | 2 | 6 | 4 | 5 | 1 | 3 |
| 6 | 6 | 4 | 5 | 1 | 3 | 2 |
| 4 | 4 | 5 | 1 | 3 | 2 | 6 |
| 5 | 5 | 1 | 3 | 2 | 6 | 4 |

3,070,295
Patented Dec. 25, 1962

3,070,295

FLUID OPERATED LOGICAL DEVICES

Hans H. Glättli, Kusnacht, Zurich, Switzerland, assignor to International Business Machines Corporation, New York, N.Y., a corporation of New York Filed May 12, 1961, Ser. No. 109,638
6 Claims. (Cl. 235—61)

This invention relates to fluid logical elements, and more particularly to binary type fluid devices which are particularly adapted to perform logical operations with respect to digital data processing.

In digital data processing machines, the binary or bi-stable device is customarily employed to denote the presence or absence of a given condition precedent by the stable state of the device. In arithmetic equipment operating in the pure binary notation, the presence or absence of the respective digits, denoted respectively by "ones" or "zeros," are represented, for example, by the conductivity status of a relay or electron valve device, by the superconductivity or resistivity of a cryogenic device, or by the remanent magnetic state of a magnetic element, to name but a few. Other bi-stable elements are combined to denote the logical functions of "and," "or," "not," "equal," "unequal" etc. Common to all of these devices is an element capable of being controlled to assume any one of two stable states, and able to produce an output which manifests the stability state in which the device rests. Preferably, the stability states should endure until an external force changes the state. It is the purpose of this invention to provide a basic bi-stable fluid element having the necessary functional requisites as set forth above, and to combine these fluid bi-stable elements so as to perform various logical functions.

It is therefore, an object to provide a fluid bi-stable element which is operative responsive to two different conditions of input control pressures to respectively assume two different states of stability, and capable of manifesting the thus assumed stability status by producing a different output pressure condition for each respective stability status.

A further object of the invention is to provide a fluid-operated bi-stable device wherein the output pressure manifesting the status of the device is utilized to maintain the device in its assumed stable state.

Specifically it is a further object to provide a fluid-operated and fluid-controlling spool valve having a constant bias force applied thereto, the valve being operable to connect an output line to a source of high pressure in a first position thereof, and to a source of low pressure in a second position thereof, the output line being connected to the valve such that the pressure therein opposes the bias force, whereby high pressure in the output line will maintain the valve in the said first position.

It is a further object to combine a plurality of bi-stable fluid elements constructed in accordance with the foregoing objects in a shift register.

Another object is to operatively combine a plurality of bi-stable fluid elements so as to produce a scale-of-two counter.

A further object is to operatively combine a plurality of bi-stable fluid elements so as to produce a digital matrix storage device with non-destructive readout.

Yet another object is to operatively combine a plurality of bi-stable fluid elements so as to produce a matrix device capable of producing outputs manifestive of the results obtained from predetermined arithmetic operations.

The foregoing and other objects, features and advantages of the invention will be apparent from the following more particular description of preferred embodiments of the invention, as illustrated in the accompanying drawings.

FIG. 1*a* is a simplified structural drawing of the basic bi-stable element.

FIG. 1*b* is a schematic representation of the structural apparatus of FIG. 1*a*.

Figures 4, 4A:
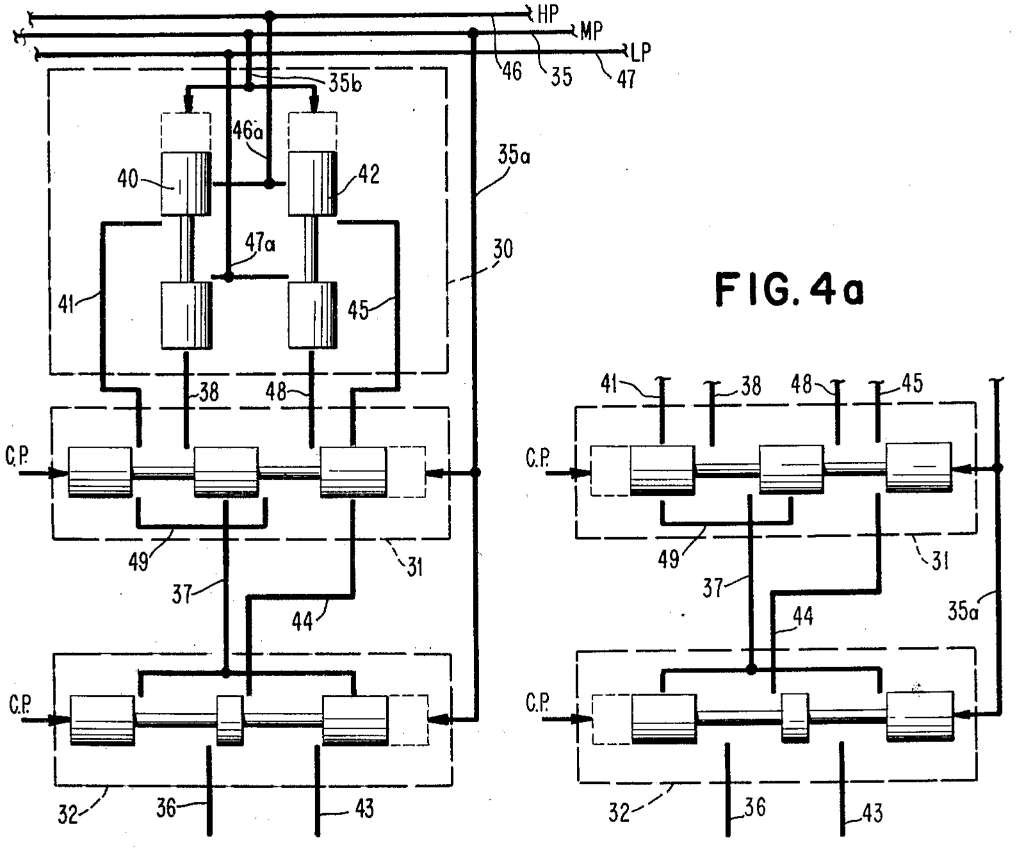
FIG. 4 shows the basic element incorporated in one order of a shift register.

FIG. 4*a* shows the alternative positions of the control valves of FIG. 4.

Figure 5:
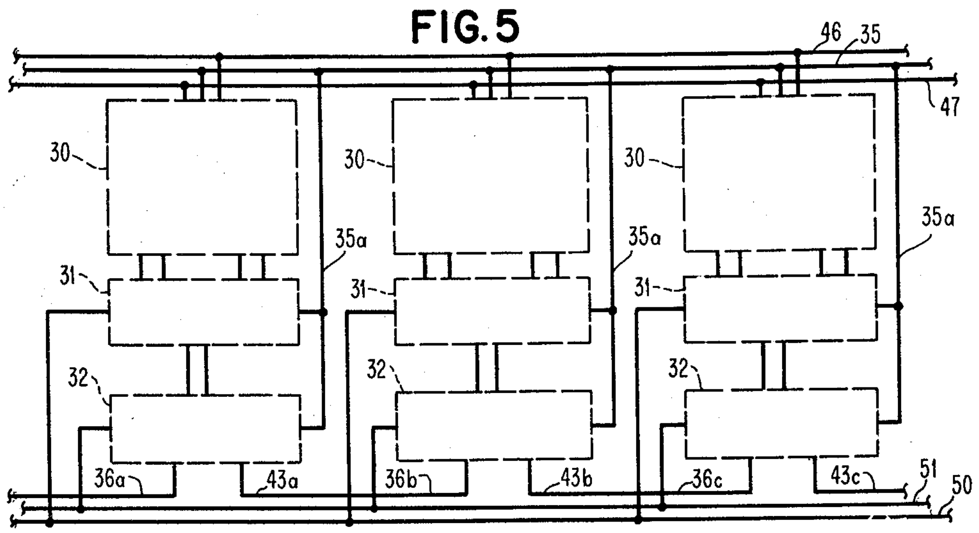

FIG. 5 shows the interconnection of a plurality of shift register orders in a multi-ordered shift register.

FIGS. 6–9 show the successive portions occupied by a plurality of bi-stable elements connected as a scale-of-two counter.

FIG. 10 is a tabulation of the successive positions of the elements in FIGS. 6–9.

FIG. 11 is a timing chart of the successive statuses of elements of the counter of FIGS. 6–9.

Figures 12, 13:
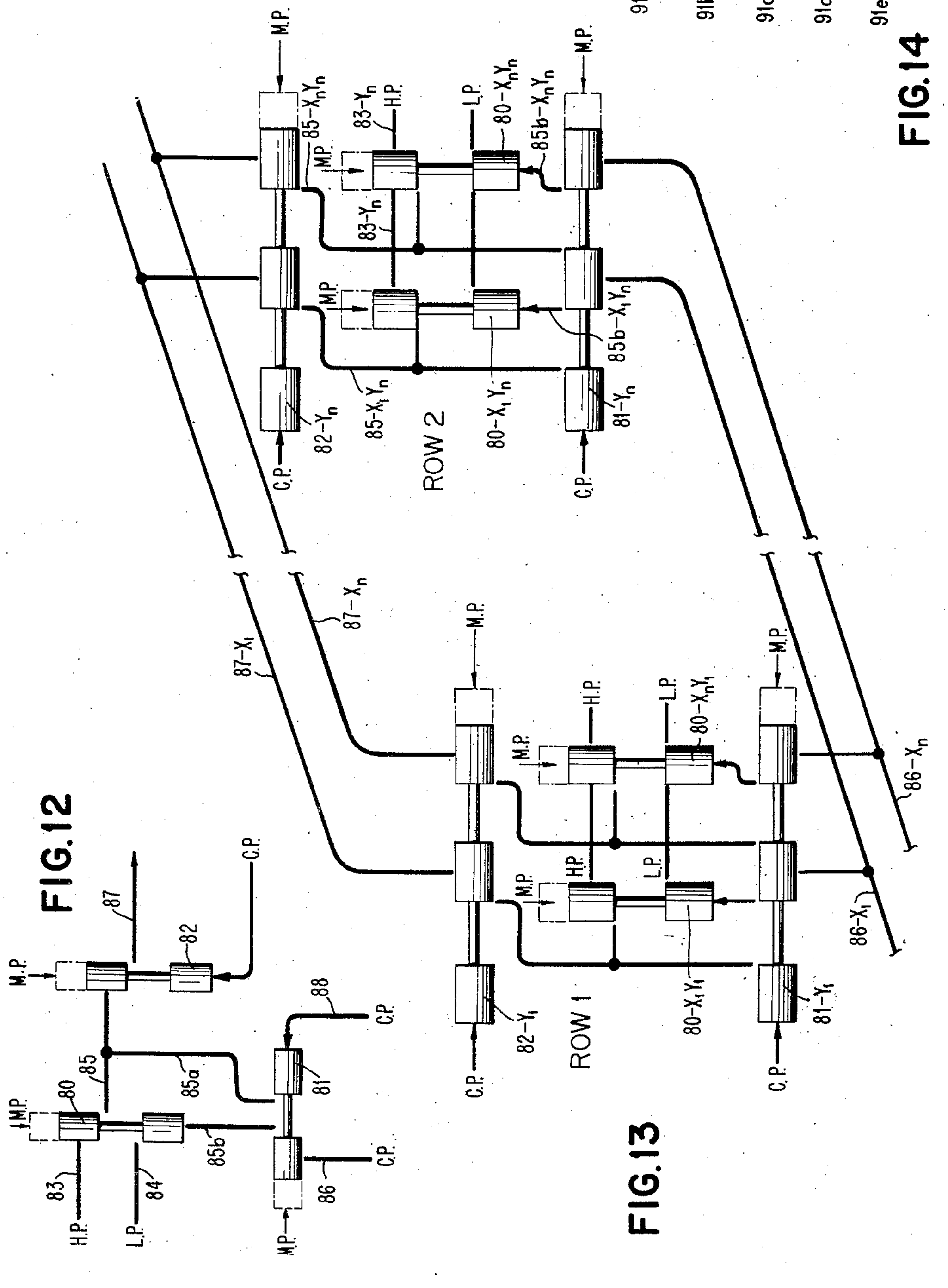

FIG. 12 is a schematic of the control and storage elements for one bit position of a digital storage matrix.

FIG. 13 shows a two by two digital storage matrix.

Figure 14:
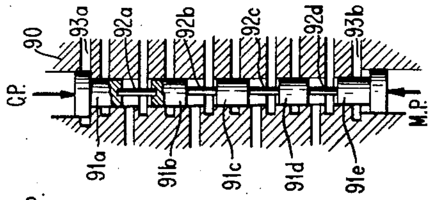

FIG. 14 shows a plural spool valve modification suitable for use in a matrix.

Figure 15:
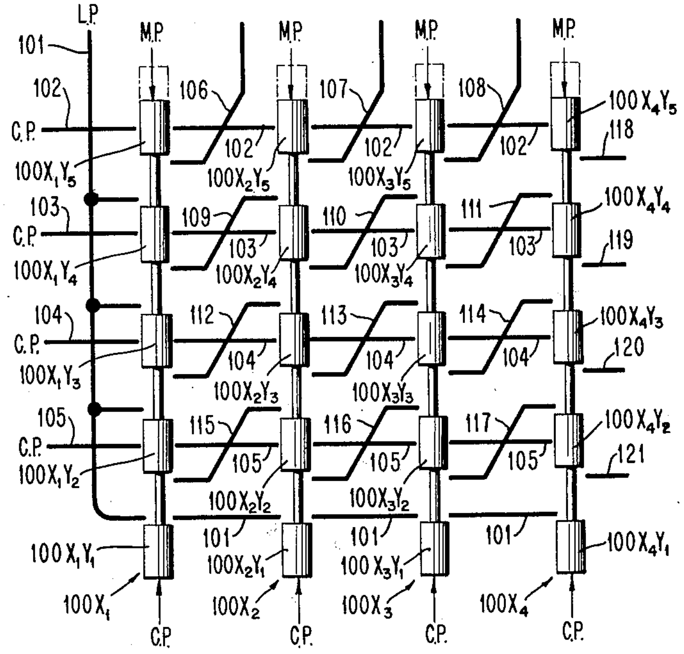

FIG. 15 shows a schematic of a matrix capable of performing arithmetic operations.

Figures 16, 16A, 16B, 17, 18A, 18B, 18C:
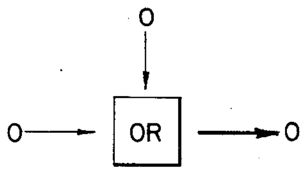

FIG. 16 shows a table of products in the system of residual classes of modulo 5.

FIGS. 16*a* and 16*b* show progressive modifications of the table of FIG. 16 to render it susceptible to processing by the FIG. 15 structure.

FIG. 17 shows a schematic "or" circuit.

FIG. 18*a* shows the product table in the system of residual classes of modulo 7.

FIGS. 18*b* and 18*c* show the progressive modifications to the table of FIG. 18*a* to adapt it to processing by the device of FIG. 15.

Figure 19:
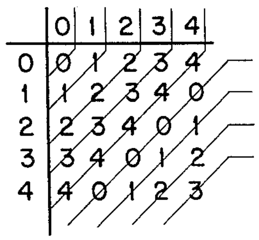

FIG. 19 shows a table of sums in the modulo five system of notation.

Figure 20:
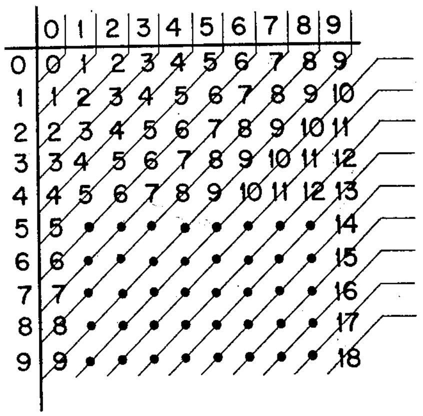

FIG. 20 shows a table of sums in the decimal system susceptible to processing by the device of FIG. 15.

*The Fluid Bi-Stable Binary Device*

Figure 1A:
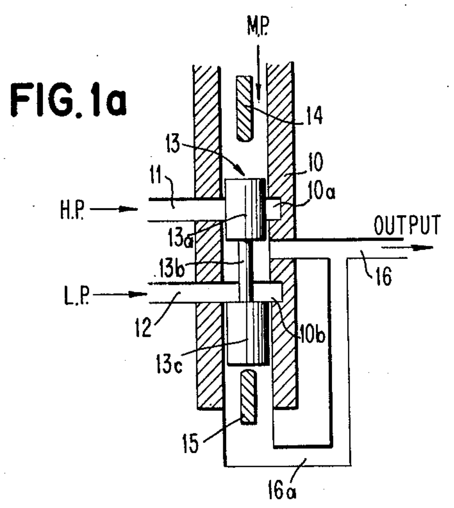

FIG. 1*a* shows a somewhat simplified structural representation of a fluid-operated and fluid-controlling bi-stable binary device, which is particularly adapted for use in combination with other such devices for the performance of various logical operations including arithmetic. The housing 10 is provided with a cylindrical bore having undercut lands **10*a* and 10*b*, which provide for the distribution of fluid introduced through the input ducts 11 and 12, the former being connected to a source of high pressure (H.P.) and the latter to low pressure (L.P.). The valve spool 13, consisting of upper spool 13*a*, connecting spindle 13*b*, and lower spool 13*c*, is so configured with respect to the lands 10*a* and 10*b* that in the respective limit positions of the valve spool 13 as defined by the fixed stops 14 and 15, one of the input ducts 11 or 12 will be blocked while the other is connected to an output duct 16 through the medial cylinder chamber between the spools 13*a* and 13*c*. The headspace above the spool 13*a* is supplied from a source of medium pressure (M.P.), while the lower headspace below the spool 13*b* is connected by pipe 16*a* to the output duct 16**.

When the valve spool 13 is established in either its upper or lower position by externally applied forces, as will be explained, the pressure status in the output duct 16 will be available to manifest the position of the valve spool 13, and also the spool will be locked in its assumed position by an unbalance of forces thereon. In the position shown, with the valve spool 13 down, the duct 12 is connected to the output duct 16 to produce low pressure therein, and also in the lower headspace. By virtue of the existence of medium pressure in the upper headspace, an unbalance of forces results to maintain the valve spool against its lower stop 15. Were the valve spool 13 moved to its upper position, the duct 11 and its attendant port would be unblocked, and high pressure would appear in output duct 16 and in the lower headspace, to produce an unbalance of forces greater in the upward direction, so as to hold the valve spool 13 against its upper stop 14. Thus, the valve spool 13 will be maintained in either of its stable positions, which can have the conventional binary "0" or "1" significance, or any other logical significance, and manifest this significance by the pressure status in output duct 16.

Figure 1B:
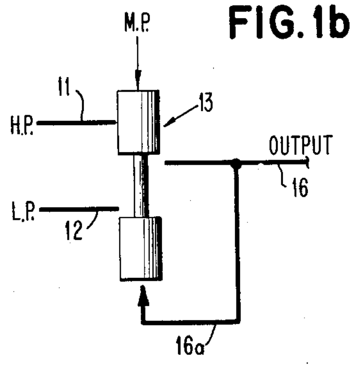
Figure 2:
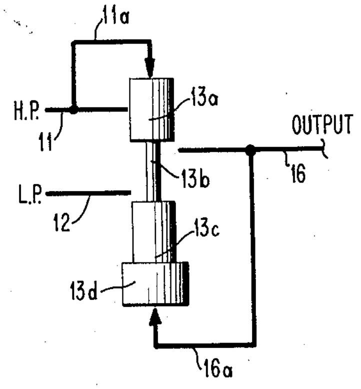
FIG. 2 is a schematic representation of an alternative embodiment of FIGS. 1*a* and 1*b*.

FIG. 1*b* is a schematic representation of the structure of FIG. 1*a*, and is used throughout succeeding figures. The alternative embodiment of FIG. 2 provides a latching type of operation without employing medium pressure fluid. Here a by-pass duct 11*a* from the high pressure input duct 11 introduces high pressure fluid to the upper headspace. The output pressure in duct 16 is by-passed to the lower headspace as before. However, an enlarged spool 13*d* is provided, the area of which with respect to that of spool 13*a* is such that an upward resultant force will be produced when high pressure appears in duct 16, and a downward force when low pressure occurs in the output duct. In a structure of this character the chamber occasioned by the different bore diameters necessary to receive the spools 13*c* and 13*d* would naturally be vented to atmosphere so as to permit free movement of the valve spool, as is shown, for example by the ports 93*a* and 93*b* in FIG. 14.

Figure 3:
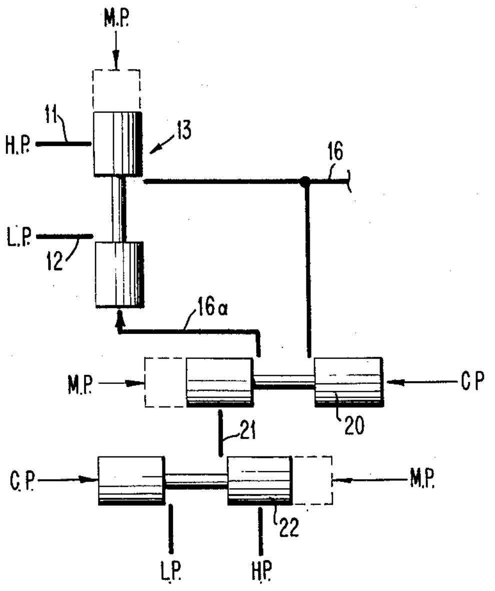
FIG. 3 is a schematic representation, showing the input control to the basic bi-stable element.

In FIG. 3 the binary element of FIG. 1*a* or 1*b* is shown together with supplementary control valves for changing the stability status of the binary element to introduce, at will, a "1" or "0." In this application the feedback loop duct 16*a* passes through a transfer valve 20, which, in the position shown, effects the same fluid circuit shown in FIG. 1*b*. If a control pressure (C.P.) is applied to the right headspace of valve 20 so as to move it to the left against the bias force of medium pressure (M.P.), the feedback duct 16*a* will be disconnected from the output duct 16 and connected to a control duct 21, into which high pressure or low pressure can be selectively introduced through control of the position of entry control valve 22, which in the position shown would introduce low pressure, and in the transferred position would introduce high pressure. Upon removal of the control pressure (C.P.) from valve 20, the valve spool 13 will be latched in its set position as previously explained.

Wherever the abbreviations L.P., M.P., and H.P. are hereinafter employed, they will denote that these pressures are constantly connected to the pipe or duct respectively so labelled. "C.P.," when it is used, will denote that the control pressure is selectively applied in accordance with the dictates of the logic to be performed, and will be of sufficient magnitude to effect movement of the member to which it is applied against the resisting force of the bias, which in most instances will be medium pressure.

*Shift Register—FIGS. 4, 4a, and 5*

In a digital shift register, each cell or digit order conventionally contains two bi-stable elements, and operates in two phases. In the first phase, a first one of the bi-stable elements receives input data and adjusts its stability status in accordance therewith, while the second element manifests its stability status as an output from the cell. In the first phase, the first and second elements are dissociated from one another. In the second phase of operation, the first and second elements are operatively associated, such that the stability status of the first element controls the second element to assume a like status. During this latter phase, the first element is dissociated from the input.

Necessarily in any shift register cell each of the bi-stable elements must be capable of maintaining its preset stability status in one phase while it manifests such status. In the other phase, it must be susceptible to control from another data source. In fluid valve terminology the bi-stable element must, in one instance, operate as a master valve to produce an output while its own status is latched, and in the other instance, operate as a slave valve.

In FIG. 4 the bi-stable element of FIG. 1 and the control principles of FIG. 3 are embodied in a shift register cell 30. For each cell there is a control valve 31 which, by its position, determines whether the cell 30 shall operate in its first or second phase of operation. A further valve 32 determines by its position whether the data shall flow from left to right or right to left in a multi-ordered register, so as to provide a reversible shift register.

For purposes of explanation it will be assumed that the direction of data flow is from left to right, that the left bi-stable element 40 receives input data, and that the right element 42 produces an output from the cell. The valve 32 will therefore remain inoperative. It will further be assumed that the downward position of the bi-stable elements represents a stored "0," and the upward position a stored "1."

For the first phase of operation of the shift register cell 30, the valve 31 is moved to the right (FIG. 4*a* position) by application of a control pressure (C.P.) which overcomes the bias pressure M.P. applied from line 35 through 35*a*. The valve 32 remains in its rest position as shown in FIG. 4. With valve 32 at rest, and 31 transferred, the pressure status existing in input pipe 36 (high pressure=1, low pressure=0) will be valved by valve 32 to duct 37. Valve 31 (FIG. 4*a*) will now connect duct 37 to duct 38. Since duct 38 connects to the lower headspace below the first bi-stable element 40, the pressure in input duct 36 will influence the position of spool valve 40. If the input pressure is low ("0" input) the unbalanced forces on the ends of the spool, by virtue of the M.P. bias applied through duct 35*b*, will force the spool 40 down. Conversely, high pressure on input duct 36 ("1" input) will overcome the M.P. bias and force the spool valve 40 up. Thus, the input pressure in duct 36 will produce a corresponding positioning of the spool 40. The latching feedback to valve 40 is blocked during this phase of operation, in that the duct 41 is disconnected from the duct 38 by valve 31 (see FIG. 4*a*).

Concurrently, during the first phase of operation, the second bi-stable element 42 produces an output manifestive of its stability status, which latter valve must at this time be latched. Examination of the position of valve 32 in FIG. 4 will reveal that the output pipe 43 is connected to duct 44, which, through conventional undercut lands in valve 31 is permanently connected to duct 45. This latter duct, 45, is ported to the medial chamber between the spools of valve 42, and, depending on the position of the spool, will be ported to high pressure or low pressure lines 46 or 47 through the respective lines and ports 46*a* and 47*a*. In the position shown of spool 42, low pressure is valved to line 45 and will appear as an output manifesting a "0" on the line 43. A further connection achieved by valve 31 in the position shown in FIG. 4*a* (phase 1) is that of connecting duct 45 to duct 48, which places output pressure on the lower spool end face to latch the valve 42 in its set position, as previously explained with respect to the operation of FIG. 3. Connection between valve 40 and 42 is blocked by the isolation of duct 48 from duct 41 through blockage of duct 49.

In the second phase of operation it is necessary that the first bi-stable element 40 be blocked from receiving any input, that the element 40 be latched in its previously set data position, and that the valve 40 control the valve 42 to assume the same data position. To this end the valve 31 is restored to its rest position (FIG. 4) by removal of control pressure (C.P.). In this position, input line 36 connecting to duct 37 is blocked by the center spool of valve 31. The position of valve 40 is manifested by the pressure status (high for "1," low for "0") in duct 41, which is now ported to duct 38 to latch valve 40, and also, through by-pass channel 49, to duct 48 to apply the output pressure from valve 40 to the lower headspace of valve 42. If valve 40 is in the position shown, low pressure from lines 47 and 47*a* will be ported to line 41, and through valve 31 to lines 38 and 48. Thus the valve 40 will remain in its downward position because of M.P. on top of the piston and L.P. on the bottom. Similarly valve 42 will be compelled to occupy the lower position. Should valve 40 be in its upper position from a "1" datum entry in phase 1, high pressure will be ported to lines 41, 38, and 48. Valve 40 will latch in its upper position, and valve 42 will move upward. The feedback loop from line 45 to duct 48 is blocked, so that the valve 42 is free to move only as a result of the interaction of the constantly applied M.P. pressure and the pressure valved to it from valve 40. Although duct 45 is permanently connected to duct 44 and an output in duct 43 thus produced, it will have no effect upon any succeeding cell, as the input thereto is blocked.

Thus, in phase 1 the valve 40 receives input data in the form of pressures on line 36, while the valve 42 produces a pressure output on line 43 manifestive of the data status of valve 42. In phase 2, the valve 40 is prevented from receiving an input but will transfer its data to valve 42. For right-to-left data transfer, with valve 32 in the position shown in FIG. 4*a*, the respective sequence of operations is the same as previously described. The only difference is that pipes 36 and 43 are functionally interchanged, so that duct 36 now manifests the output from valve 42, while duct 43 serves as an input to the valve 40.

In FIG. 5 the interconnection of three orders of shift register cells 30 and their associated valves 31 and 32 is shown. The common pressure pipes 46, 35, and 47 respectively supply high, medium, and low pressures to all cells in parallel as is shown for the one cell in FIG. 4. The line 50 provides a common parallel control pressure for each of the valves 31, so that they will all occupy the same position to determine phase 1 or phase 2 in the operation of the shift register. The input and output lines 36 and 43 are serially connected between orders, such that the output from each order is connected to the input of the next succeeding order, the initial order input 36*a* receiving data, and the final order output 43*c* delivering an output. The line 51 provides the control over valves 32 to control the direction of data shift.

It should be realized that, although a serial data entry and read-out has been shown, each of the cells produces an output simultaneously on its respective duct 43. Thus, by tapping into these ducts a parallel read-out can be achieved following a succession of serial read-in cycles. So too, parallel read-in can be achieved by introducing an additional valve into the pipes 36 and entering pressures into all orders during phase 1 of the operation. Thus, it is possible to operate the shift register in all modes of operation; (*a*) serial in, serial out (*b*) serial in, parallel out (*c*) parallel in, serial out and (*d*) parallel in, parallel out.

*Scale-of-Two Counter—FIGS. 6–11*

A scale-of-two counter, or frequency divider, produces a single output manifestation upon the occurrence of two successive input manifestations. In the fluid counter, illustrated in its successive positions in FIGS. 6 through 9, a single low pressure output manifestation is produced following the occurrence of two low pressure input pulses, with intervening high pressure pulses. Stated another way a single change in the output pressure status occurs for each two changes in status of the input pressures.

The latching feature described with respect to FIG. 1 is again employed in the counter of FIG. 6, each separate valve in the counter having the constant M.P. bias opposed by a high or low pressure on the opposite side of the valve, which pressure may be self-generated for latching purposes or produced by another valve for entry control purposes. Each valve also has porting, such that the position of the individual valve is manifested as an appropriate output pressure.

Specifically, of the three valves 60, 61, and 62 in FIG. 6, the valve 60 receives the input pressure changes by application of a control pressure (C.P.) to the upper headspace in the cylinder. This control pressure is either of a high pressure or a low pressure, so that the M.P. bias force will be respectively inferior to, or superior to the control pressure to effect the corresponding movement of the valve 60. Each of the other valves 61 and 62 has a constant bias force generated by M.P., applied as shown in the figures. The dotted headspaces above or below the pistons indicate their relative positions in their respective cylinders. A further convention is established wherein high pressure manifests a binary zero and low pressure a binary one. Additionally, the valves 60, 61, and 62 register a binary zero if they occupy their lower positions, and a binary one if they occupy their upper positions. As would be expected in a device of this nature, only the position of valve 60 is independent of the positions of the remaining valves, as its sole position control is vested in the presence or absence of C.P. The positions of the remaining valves will be a function of the history of operation of the remaining valves, although the position of any one valve can be defined by the relative positions of the remaining two valves. So also is the output pressure a function of the operating history of the three valves, although it too can be defined at any instant by the relative positions of the three valves.

In order to break into the cycle and trace its operation, it will be assumed that the valves 60, 61, and 62 are initially in the position shown in FIG. 6, with C.P. equal to H.P., so that the valve 60 is forced downward. With H.P. constantly connected to lines 63 and 64, and low pressure constantly connected to lines 65 and 66, the output duct 70 will manifest a high pressure (binary zero). All of the valves are in their lower position, which in convention chosen, denotes a binary zero. The input control pressure is high, also denoting a binary zero. Therefore, both the input and output are zero, and all valves are in the binary "0" position. This relativity is shown in tabular form in the first horizontal row in FIG. 10, and graphically by the first timing position in FIG. 11.

With the position of the elements shown in FIG. 6, H.P. in line 63 is ported to duct 67 which through valve 60 is ported to duct 68 leading to the upper headspace over valve 62 compelling it to occupy its lower position despite the resistance of M.P. applied through pipe 69. The remaining H.P. line 64 is ported directly to output duct 70 by virtue of the lower set of valve 61. Low pressure duct 65 is blocked by valve 62, but 65*a* is ported to duct 71 and its two branches 71*a* and 71*b*. The branch 71*a* is ported through valve 60 to duct 72 and the lower headspace of valve 61, thus permitting it to occupy its lower position under the influence of M.P. The second branch 71*b* is blocked by the position of valve 61. The remaining low pressure duct 66, is by the position of valve 61, ported to line 73 and its branches 73*a* and 73*b*, both of which are blocked by the position of valve 61. Thus all three of the valves are stabilized and locked in the positions shown in FIG. 6, and the output line 70 has high pressure connected thereto. Additionally there is no intermixing of fluid pressures, in that each source of pressure terminates in some physical structure that isolates it from the other pressure sources. Consequently, there is no fluid flow except that required to change the stability statuses of the various devices. In their stable states the devices permit of no fluid flow, except possibly that due to leakage.

In the second time interval shown in FIG. 7 the input pressure C.P. is reduced to the low pressure level, so that valve 60 moves upward under the influence of M.P. Since valve 61 was previously established in its lower position, L.P. in duct 66 will continue to be ported to pipe 73, 73*a* now being unblocked so as to port the low pressure in 73*a* to duct 72 to maintain valve 61 in the down position. Valve 62 in FIG. 6 was down. When valve 60 moves up, as in FIG. 7, the low pressure in duct 73*b* is now ported to line 68 and the upper headspace of valve 62, thus allowing it to move up. In its up position it is ineffective to provide any control over any other valve or the output duct, in that L.P. duct 65*a* is blocked, duct 65 although ported to duct 67 is blocked by valve 60. H.P. duct 63 is ported to duct 71 which is blocked in both its branches 71*a* and 71*b*. The tabular and graphical showings of the positions of the elements and the pressure statuses of FIG. 7 are shown in the second row of FIG. 10 and the second timing position of FIG. 11.

The third time interval produces the relativity of parts shown in FIG. 8. Here the movement is initiated by the reapplication H.P. as a control pressure to valve 60 moving it down. From the previous cycle, valve 62 was up. With the transfer of valve 60, L.P. in duct 65 is ported to duct 67 through valve 60 (transferred) to duct 68 and to the upper headspace over valve 62. It, therefore, retains its status (1). The valve 61, on the other hand, has its position determined by the pressure status in duct 72. With the transfer of valve 60 and the up position of valve 62, H.P. in duct 63 is ported to duct 71, branch 71*a*, valve 60 (now open) to duct 72, compelling valve 61 to move upward. The other branch 71*b*, containing high pressure is ported through valve 61 to output duct 70 to manifest a binary "0." L.P. in branch 65*a* is blocked by the lower spool of valve 62, and L.P. in duct 66 is blocked by valve 61. H.P. in duct 64 is ported to line 73 which is blocked in both its branches by the position of valve 60. The tabular and graphical representations of the third time interval of the cycle are shown in FIGS. 10 and 11 in the third row and third column respectively.

The fourth and final position of the counter is shown in FIG. 9 where the parts are oriented with valve 60 up, valve 61 up, and valve 62 down, the control pressure, C.P. being lowered to permit valve 60 to return to its normal position. Valve 61 remains unchanged over its previous position by virtue of the high pressure status of duct 72 which is ported through valve 60 to duct 73*a*, and through valve 61 to high pressure line 64. Valve 62 moves downward under the influence of high pressure in line 68 which is ported by valve 60 to duct 73*b*, and thence to line 64 through valve 61. Output pressure in line 70 changes from high to low during this cycle as that line is ported to 71*b* which in turn is ported through valve 62 to low pressure input branch line 65*a*. H.P. in line 63 is ultimately blocked in line 67, so as to be ineffective. L.P. in line 66 is directly blocked, as is L.P. in line 65.

If, following the fourth time interval, a high control pressure is applied to the valve 60, it and all other valves will return to their FIG. 6 positions the cycle of operations will repeat as described. From FIGS. 10 and 11 it is to be noted that the input pressure progressively manifested the binary progression 0–1–0–1 while the output pressure manifestation progressed 0–0–0–1. Therefore, a single "1" output is produced for each two "1" inputs, thus effecting a frequency division by two, or effecting a scale-of-two counter function. It should be noted that the position of the valve 60 depends only on the magnitude of the control pressure, and that the position of only one of the two remaining valves changes at one time. Therefore, the device is fully stabilized in all phases of its operation, and does not depend upon the relative transfer speeds of any elements.

*Digital Storage Matrix—FIGS. 12–14*

The binary element of FIG. 1*a* is susceptible to incorporation into a digital storage matrix such as that shown in FIG. 13. In such an application, it fulfills the necessary functional requirement of providing a bi-stable storage for each digit, as well as lending itself to the coordinate selection type of control necessary in a matrix storage device. In the drawing a 2 x 2 matrix has been illustrated, but it will be apparent from the explanation to follow how this may be expanded to any capacity.

In FIG. 12 a single storage element 80, and its attendant read-in control valve 81, and read-out valve 82, has been divorced from the matrical showing of FIG. 13 for the purpose of clarity of exposition. As in all instances previously described, the valve 80 is biased with a constant pressure M.P. and features the regenerative self-latching function. Specifically, high pressure in line 83, or low pressure in line 84, will be ported to outlet duct 85, depending upon the position of the valve 80. This output pressure is led through the duct 85*a*, valve 81, and duct 85*b*, to the lower headspace of valve 80. Thus, as explained, with reference to FIG. 1*a*, the valve 80 will be held by an unbalance of pressures in its set position. In order that a datum may be entered, the valve 81 is moved to the left by application of a suitable control pressure C.P. to pipe 88 so as to close duct 85*a* and port 85*b* to data input line 86. If the pressure in line 86 is low, the valve 80 will be moved downward by M.P. to store a binary "0." If the pressure in 86 is high, the valve 80 will be moved upward to store a binary "1." Upon the restoration of the valve 81 to its normal position, the pressure by-pass ducts 85*a* and 85*b* become operative to hold the valve in its set position. This position is manifested by the pressure status in the duct 85, which status, upon transfer of valve 82 by an applied control pressure, becomes available on the data output line 87. It is to be noted that the position of valve 80, once set, will be latched despite repeated operations of the valve 82, thus permitting non-destructive readout of the data storage.

In the matrix of FIG. 13 the valves 81 and 82 each serves a row of storage elements, and are appropriately expanded with the requisite number of spools so as to isolate the independent column elements. The data input line 86–$X_1$ and 86–$X_n$, on the other hand, serve a column of data storage elements. So also are the readout lines 87–$X_1$ and 87–$X_n$ common to a column of elements. In both instances the subscript "*n*" has been employed to indicate that any number of columns desired may be interposed between the first and the last. The row data read-in valves 81–$Y_1$ and 81–$Y_n$ also employ the "*n*" subscript to indicate that the matrix may be expanded to any desired capability in excess of the two illustrated.

As in most matrical storage devices, the coincident operation of column and row controls effects the selection of a single storage element at the intersection. In the instant matrix, this principle of operation is employed. For row selection, some one of the data entry valves is transferred to the right by application of a suitable control pressure sufficient in magnitude to overcome the M.P. bias. For column selection, a single one of the lines 86 has pressure applied thereto to manifest the desired input, high pressure being employed to store a binary "1" and low pressure to store a binary "0". The remaining non-selected column lines 86 are closed. Thus for example, in FIG. 13 if it is desired to enter a binary "1" into the storage element 80–$X_1Y_n$, the input line 86–$X_1$ will have high pressure applied thereto, and the input control valve 81–$Y_n$ will have a control pressure applied thereto to transfer it to the right. With such conditions precedent, high pressure in 86–$X_1$ will be ported through the valve 81–$Y_n$ to the duct 85$_b$–$X_1Y_n$ to the lower headspace of valve 80–$X_1Y_n$ thus moving it upward against the bias of M.P. Upon restoration of the valve 81–$Y_n$ to its normal position, the high pressure in duct 83–$Y_n$ will be ported to the duct 85–$X_1Y_n$ and through valve 81–$Y_n$ to hold the thus-set valve to its upward binary "1" storing position.

Inasmuch as operation of the valve 81–$Y_n$ also ports the line 86–$X_n$ to the duct 85$_b$–$X_nY_n$, it is necessary that the line 86–$X_n$ be closed, lest the data storage exhibited in the valve 80–$X_nY_n$ be lost. For example, should this valve (80–$X_nY_n$) have a binary "1" stored therein, the lower headspace would contain fluid under high pressure, and were the line 86–$X_n$ connected to low pressure, this high pressure would be bled off, thus losing the storage. The further storage elements 80–$X_1Y_1$ and 80–$X_nY_n$ are obviously unaffected by the data entry cycle just described. Inasmuch as the valve 81–$Y_1$ is not operated, the pressure status in the lower headspace of these storage elements is therefore unaffected.

For data read-out, one of the valves 82 is operated, and the data stored in the row of elements will be manifested in parallel by the respective pressure statuses in the lines 87. This read-out will not destroy the storage in the matrix and thus may be repeatedly had. In the example chosen if the *n*th read-out control valve 82–$Y_n$ is transferred, by application of a suitable control pressure, the ducts 85–$X_1Y_n$ and 85–$X_nY_n$ will be respectively ported to the lines 87–$X_1$ and 87–$X_n$. Since the valve 80–$X_1Y_n$ stores a binary "1" and the valve 80–$X_nY_n$ stores a binary "0," the respective lines will manifest high pressure and low pressure in that order. The read-out therefore for row *n* will be $X_1=1$ and $X_n=0$. It is to be noted that the output lines 87 would be connected to work devices which are pressure responsive rather than flow responsive, so that no undue pressure drops occur within the matrix so as to produce unstable operation.

Selection of any other single storage element for data read-in can be effected by a simultaneous energization of the appropriate row read-in valve 81 and application of a storage control pressure to the required column line 86. Similarly, the parallel readout of any one row of data can be effected by application of a suitable control pressure to the appropriate read-out control valve 82.

While the operation of the matrix for the selection of a single valve for operation during data read-in had been described, it will readily be apparent that parallel read-in may also be achieved. In such instance the valve 81–$Y_n$ would again be operated and pressures manifestive of the desired data input applied concurrently to the data entry ducts 86–$X_1$ and 86–$X_n$. If, as before, high pressure is introduced into 86–$X_1$, the valve 80–$X_1Y_n$ will move upward. If low pressure is introduced into 86–$X_n$ (binary "0") the valve 80–$X_nY_n$ will occupy the lower position. Thus the system provides for the selective entry into any one storage position while retaining the storage in no-selected positions, or the parallel data entry into all storage positions in a row. Read-out is invariably parallel by columns of the data stored in the row selected.

Inasmuch as the read-in valves 81 and the read-out valves 82 are common to a plurality of rows it is required for any reasonable sized memory that these valves have a large number of independent spools connected by suitable spindles. Because of the difficulty in accurately mating long cylindrical holes and long cylindrical valves, the structure of FIG. 14 offers a desirable solution. Here a housing 90 is provided with a conventional cylindrical bore and suitably spaced ports. The independent spools 91*a*, 91*b*, etc. are spaced from one another by spindles 92*a*, 92*b*, etc. These spindles fit within recesses in the ends of the spools such that they are capable of transmitting only compression loads. In order to maintain the spool and spindle assembly under constant compression, the end spools have an enlarged area such that the resultant end forces on the assembly are larger than any internal forces. Atmospheric vents 93*a* and 93*b* provide unrestricted movement of the composite valve spool.

This construction permits a relaxation of machining tolerances in a valve of this character.

*Arithmetic Matrix—FIG. 15*

A further matrical array of fluid operated elements is shown in FIG. 15. With this particular configuration of components, arithmetic operations, such as multiplication and addition, can be performed. The combined operation of one-out-of-*n* *x* units and one-out-of-*n* *y* units produces a unique output, manifestive of the sum or product of the inputs. Specifically, the arrangement consists of four multi-spooled valves 100$X_1$ to 100$X_4$, each of which has a constant downwardly applied bias pressure M.P. and individually controllable motivating pressures C.P., the magnitude of which is greater than M.P. Each of these pressures, when applied, represents an *x* input. The *y* input is applied as a control pressure (high pressure), applied selectively to one of the input lines 102 to 105. Depending on which of the X and L lines have control pressures applied thereto will depend which one of the lines 106, 107, 108, 118, 119, 120, or 121 will have high pressure appearing therein, the remaining lines all having low pressure.

In the position of the valves shown in FIG. 15, all output pipes will manifest a low pressure, indicating no output. This results from the porting of low pressure line 101 as follows:

(*a*) line 101, valve 100$X_1$, to duct 106
(*b*) line 101, valve 100$X_1$, duct 109, valve 100$X_2$, to duct 107
(*c*) line 101, valve 100$X_1$, duct 112, valve 100$X_2$, duct 110, valve 100$X_3$, to duct 108
(*d*) line 101, valve 100$X_1$, duct 115, valve 100$X_2$, duct 113, valve 100$X_3$, duct 111, valve 100$X_4$ to duct 118
(*e*) line 101, valve 100$X_2$, duct 116, valve 100$X_3$, duct 114, valve 100$X_4$, to duct 119
(*f*) line 101, valve 100$X_3$, duct 117, valve 100$X_4$, to duct 120
(*g*) line 101, valve 100$X_4$, to duct 121

The line 101 is connected in parallel to the lowermost chamber of all of the valves 100$X_1$, 100$X_2$, 100$X_3$ and 100$X_4$ as is shown Similarly, the duct 102 connects all valves in parallel, as do the ducts 103, 104, and 105.

With the elements shown, and if all sixteen combinations were individually traced, it would be found that a unique one of seven outputs would be manifested. To trace but one, for example, let it be assumed that control pressures are applied to line 105 and to the control valve 100$X_1$, to move it upward. With such conditions precedent, high pressure in line 105 will pass serially through valve 100$X_1$ (transferred), duct 115, valve 100$X_2$ (normal), duct 113, valve 100$X_3$ (normal), duct 111, valve 100$X_4$ (normal), and to duct 118 to produce a high pressure output therein. Although pressure appears in duct 105 it will be blocked by the spools 100$X_2Y_2$, 100$X_3Y_2$, and 100$X_4Y_2$ to exclude high pressure from all but the path chosen.

Obviously with sixteen combinations of inputs and only seven outputs, some duplication of outputs is necessary. The same output manifestation as that in the chosen example (duct 118) will be produced by the following combinations; $X_2$ and $Y_2$, $X_3$ and $Y_3$, and $X_4$ and $Y_4$. In short, the disposition of outputs lies along the respective diagonals of the matrix. Thus, the only unique combinations are $X_1Y_4$ and $X_4Y_1$ representing the upper left corner and lower right corner of the matrix respectively.

This matrix finds particular utility in the multiplication of two numbers in the system of residual classes. In the modulo 5 system, for example, the table of product values is shown in FIG. 16. Inasmuch as the product of any number and zero is always zero, the first column and row products, equal to zero, can be eliminated by a simple "or" circuit, such as that shown schematically in FIG. 17, wherein a "0" input as either multiplier or multiplicand produces a "0" product output. With such elimination, the table of modulo 5 products then appears as in FIG. 16*a* which is a 4 x 4 matrix. The same product values in FIG. 16*a*, however, do not line up along common diagonals. Therefore, by transposition of the columns and rows to achieve the alignment necessary, the data significance of the columns and rows and diagonals is shown in FIG. 16*b*. By comparison with the structure of FIG. 15, it will readily be detected that the apparatus shown there is capable of producing outputs manifesting the modulo 5 product values of a modulo 5 multiplier and multiplicand.

FIG. 18*a* represents the product table in the modulo 7 numeration system. Here again, by employing an "or" circuit for multiplication by zero, the table transforms to that shown in FIG. 18*b*. Again by transposition, the data array of FIG. 18*c* is achieved, which displays the characteristic diagonal arrangement of like products. A device such as that shown in FIG. 15, but expanded to encompass a 6 x 6 matrix will produce outputs in accordance with the truth table of FIG. 18*c*.

FIG. 19 represents another arithmetic truth table susceptible to processing by the FIG. 15 type of apparatus with but slight expansion to a 5 x 5 matrix. This table represents sums in the modulo 5 system. A final table of sums is the decimal table shown in FIG. 20. Here again the diagonal disposition is preserved, and an expansion of the matrix to 10 x 10 is required. Such expansion would obviously employ the structure of FIG. 14. The foregoing arithmetic operations are but a few examples of the capabilities of the arithmetic matrix of FIG. 15. By suitable transposition, other systems of numeration can be handled.

While the invention has been particularly shown and described with references to preferred embodiments thereof, it will be understood by those skilled in the art that various changes in form and details may be made therein without departing from the spirit and scope of the invention.

What is claimed is:

1. Fluid responsive apparatus for storing a binary datum comprising a housing having an output duct and a pair of input ducts, the said input ducts having fluid supplied thereto at two different respective pressures, a valve member movable within said housing between two fixed limit positions, and adapted in each said limit position to connect said output duct with a respective one of said input ducts, means for producing a constant bias force tending to move said valve member to that limit position wherein the said output duct is connected to the input duct having fluid at the lower of said different respective pressures, a datum entry duct, a control duct, means for selectively connecting said control duct to said output duct or to said datum entry duct, means responsive to the pressure status in said control duct for producing a force on said valve member in opposition to said bias force, and means for selectively producing in said datum entry duct fluid pressure of one of two levels manifestive of a binary zero or binary one datum, the pressure levels in all instances being so chosen that the lesser pressure produces a force inferior to said bias force and the greater pressure produces a force superior to said bias force.

2. A fluid operated binary data shifting register cell comprising first and second valves, each having an output duct and a pair of input ducts supplied with fluid at respective high and low pressure levels, and each selectively operable to connect its respective output duct with either one of said input duct; means for separately biasing each of said valves to that status of operation wherein the respective output duct is connected to the low pressure fluid input duct; fluid operated means for producing in each of said valves a force in opposition to said bias force, and operable in response to fluid under high pressure to move the respective valve to that status of operation wherein the respective output duct is connected to the high pressure fluid input duct; a data input duct; a data output duct; a bi-positional control valve operable in a first of its operating positions to connect the fluid operated means associated with said first valve to said data input duct, to block the output duct of said first valve, and to connect the output duct of said second valve to said data output duct and to the fluid operated means, the said control valve being further operative in its second operating position to connect the output duct of said first valve to the fluid operated means of said first and second valves, and to block said input duct; and means operable when said control valve is in its first operating position for selectively introducing fluid under high or low pressure into the data input duct to control the status of said first valve to manifest the respective binary datum input, the position of said second valve producing a pressure in said data output duct manifestive of the binary datum stored in said second valve.

3. A fluid operated scale-of-two counter for producing a single fluid pressure increase in an output duct in response to the occurrence of two fluid pressure increases in an input duct to which fluid is supplied at low and high pressures in alternate succession, comprising (*a*) first, second, and third valves, each operable to assume a first and a second position to effect selective interconnection of the pipes connected thereto, each having a separate biasing means to bias the valve to a first of said two positions, and separate fluid-operated means for shifting the valve to a second of its two positions, the said shifting means of said second valve being connected to said input duct;

(*b*) a high pressure fluid supply duct;

(*c*) a low pressure fluid supply duct;

(*d*) the said first valve having four pipes connected therewith, the first and second of which are respectively connected to said high and low pressure supply ducts, and the valve being operable in said first position to connect said first pipe with said third pipe and said second pipe with said fourth pipe, and in said second position of operation to connect said first pipe with said fourth pipe and said second pipe with said third pipe;

(*e*) the said second valve having five pipes connected therewith, the first and second of which are respectively connected to said third and fourth pipes of said first valve, and the third and fourth ones of which are respectively connected to the shifting means of said first and third valves, the valve being operable in the first of said two positions to block the first and second pipes connected thereto and to connect said fifth pipe with said third and said fourth pipes, and in the second of said positions to connect said first pipe with said fourth pipe, said second pipe with said third pipe, and to block said fifth pipe;

(*f*) the said third valve having five pipes connected therewith, the first of which is connected with said third pipe of said first valve, the second connected to the fifth pipe of said second valve, the third connected to said low pressure duct, the fourth connected to said high pressure duct, and the fifth connected to said output duct, the valve being operable in said first position to block said first pipe, and to connect said second pipe with said third pipe and said fourth pipe with said fifth pipe, and in the said second position to block said third pipe and to connect said first pipe with said fifth pipe and said second pipe with said fourth pipe, (*g*) and the said high and low pressure levels having such magnitude that said biasing means for each of said valves will be overcome only by the application of high pressure fluid to said shifting means.

4. A fluid operated binary data storage matrix comprising a plurality of bi-stable fluid operated datum-storing valves arranged in columns and rows, each having a single output duct, and a pair of input ducts selectively connecting with the single output duct in the respective stable datum states of the valve; sources of high and low pressure fluid respectively connected to the corresponding input ducts of all said datum-storing valves, whereby the pressure statuses in the respective output ducts will manifest the relative positions of the valves; a plurality of data entry valves each connected to a row of said datum-storing valves; a plurality data entry ducts each common to a column of said datum-storing valves; means responsive to the operation of one of said data entry valves and the application of a fluid pressure in one of said data entry ducts manifestive of the desired binary datum to be stored for causing the datum-storing valve common to the selected column and row to assume a datum-storing state corresponding to the character of the pressure in said data entry duct; a plurality of data read-out ducts common to a column of datum-storing valves; and a plurality of data read-out valves each adapted when operated to connect each of the said output ducts of a row of said datum-storing valves to a corresponding one of said data read-out ducts, whereby the respective pressure statuses in said output ducts of the selected row will appear as a parallel data output in all said data read-out ducts.

5. A fluid operated logical matrix capable of generating any one out of $X+Y-1$ output manifestations indicative of the logical significance of given combinations of one out of X inputs with one out of Y inputs, where X and Y are integral numbers greater than one, comprising, X seriately disposed two position valves, each valve having Y pairs of seriately disposed fluid input ducts and an output duct associated with each such pair of input ducts, each valve being operable to connect the respective output ducts with either one of the associated pairs of input ducts in the respective two positions of the valves; means biasing the valves to a corresponding one of the positions; means for selectively moving any one of said valves to a second position; Y input ducts, having a unique pressure status selectively applied thereto to manifest a desired one out of Y inputs, each duct being connected to a corresponding one duct of a corresponding pair of input ducts of all said valves; a common duct connecting a source of low pressure to all the remaining fluid input ducts of the first of said X valves and to the corresponding unconnected one duct of the Y'*th* pair of input ducts of the remaining $X-1$ valves; $X+Y-1$ logic manifesting output ducts respectively connected to the first of the Y output ducts of each of the first $X$—1 of said valves, and to all the output ducts of the X'*th* one of said valves; means connecting the unconnected fluid output duct of each valve with the unconnected fluid input duct of that pair of input ducts of the next succeeding valve having a Y positional status equal to one less than that of the output duct to be connected thereto; whereby the combined logical inputs effected by the movement of one of said X valves and the application of a unique input pressure to one of said Y input ducts will produce an output pressure on one of said $X+Y-1$ output ducts in accordance with the combinations of inputs.

6. A fluid operated logical matrix comprising, a plurality of two position control valves each having a plurality of fluid input ducts and a pair of fluid output ducts associated with each of said fluid input ducts, the said valves being operative in one position to connect each of the fluid input ducts with a corresponding one of said associated fluid output ducts, and in the other position to connect each input duct with the other of said associated output ducts; means for selectively establishing each of said valves in one of their two positions to manifest a desired first logical input; a plurality of logic input ducts having fluid selectively introduced therein at one of two pressure levels to manifest a second desired logical input; a plurality of logic output ducts; and means so interconnecting said logic input ducts, said logic output ducts, and the fluid input and output ducts of each of said valves such that said logic output ducts manifest different respective pressure statuses in accordance with given combinations of the respective positions of said valves and the pressure statuses of the fluid in said logic input ducts.

References Cited in the file of this patent

UNITED STATES PATENTS

| | | |
|---|---|---|
| 2,991,805 | Page | July 11, 1961 |
| 3,001,549 | Nelson et al. | Sept. 26, 1961 |

FOREIGN PATENTS

| | | |
|---|---|---|
| 606,733 | Canada | Oct. 11, 1960 |